United States Patent
Bonner et al.

(10) Patent No.: US 7,085,551 B1
(45) Date of Patent: Aug. 1, 2006

(54) SYSTEMS AND METHODS FOR PROVIDING NON-DEDICATED WIRELESS BACKUP SERVICE FOR MONITORED SECURITY SYSTEMS

(75) Inventors: Thomas Wayne Bonner, Smyrna, GA (US); Russell Baggett, Cumming, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 188 days.

(21) Appl. No.: 10/684,876

(22) Filed: Oct. 13, 2003

Related U.S. Application Data

(60) Provisional application No. 60/461,953, filed on Apr. 8, 2003.

(51) Int. Cl.
*H04M 11/04* (2006.01)

(52) U.S. Cl. ............... 455/404.1; 455/41.2; 455/404.2; 455/445; 455/464; 455/556.1; 379/39; 379/45

(58) Field of Classification Search .............. 455/41.2, 455/404.1, 404.2, 445, 464, 552.2, 556.1; 379/39, 45; 340/539.1, 686.6
See application file for complete search history.

(56) References Cited

U.S. PATENT DOCUMENTS

| | | | |
|---|---|---|---|
| 4,993,059 A | | 2/1991 | Smith et al. |
| 5,185,779 A | | 2/1993 | Dop et al. |
| 5,239,586 A | * | 8/1993 | Marui ........................ 704/270 |
| 5,675,626 A | | 10/1997 | Davis |
| 5,832,378 A | * | 11/1998 | Zicker et al. ............. 455/552.1 |
| 5,940,758 A | * | 8/1999 | Chavez et al. ........... 455/432.2 |
| 5,978,684 A | * | 11/1999 | Cook et al. .................. 455/462 |
| 6,032,037 A | | 2/2000 | Jeffers |
| 6,222,458 B1 | * | 4/2001 | Harris ...................... 340/686.6 |
| 6,263,050 B1 | * | 7/2001 | Akhteruzzaman et al. .... 379/45 |
| 6,411,802 B1 | | 6/2002 | Cardina et al. |
| 6,430,268 B1 | * | 8/2002 | Petite .......................... 379/39 |
| 6,532,360 B1 | | 3/2003 | Shaffer |
| 6,667,688 B1 | * | 12/2003 | Menard et al. ............. 340/531 |
| 6,810,234 B1 | * | 10/2004 | Rasanen .................... 455/41.2 |
| 6,844,813 B1 | * | 1/2005 | Hardman ................. 340/539.1 |
| 2002/0167293 A1 | * | 11/2002 | Ptasinski et al. ............ 320/132 |
| 2003/0176199 A1 | * | 9/2003 | Burnham ..................... 455/464 |
| 2003/0207689 A1 | * | 11/2003 | Roberts et al. ............. 455/445 |

* cited by examiner

*Primary Examiner*—Steve M. D'Agosta
(74) *Attorney, Agent, or Firm*—Parks Knowlton LLC; Cynthia R. Parks, Esq.; Robert Evora

(57) ABSTRACT

An intelligent interface provides a non-dedicated wireless communications path for reporting alarm events from a landline-based alarm system to a remote monitoring system. The intelligent interface includes a cradle for a cellular handset or other wireless device, and a network connector (such as an RJ31X jack) between an alarm system control panel and the PSTN. When a wireless device is present in the cradle, the intelligent interface bypasses the landline and routes all security calls from the alarm system control panel through an analog-to-digital digital signal processor and to the wireless device, which places a call to the remote monitoring center. When no wireless device is present, the intelligent interface allows the alarm system control panel to seize the landline to place the security call.

17 Claims, 4 Drawing Sheets

SYSTEMS AND METHODS FOR PROVIDING NON-DEDICATED WIRELESS BACKUP SERVICE FOR MONITORED SECURITY SYSTEMS

RELATED APPLICATION

This application claims the benefit of the filing date of U.S. Provisional Application Ser. No. 60/461,953, entitled Systems and Methods for "Providing Non-Dedicated Wireless Backup Service for Monitored Security Systems" filed Apr. 8, 2003, the entirety of which is incorporated herein.

FIELD OF THE INVENTION

The present invention relates in general to telecommunications and monitored security systems, and more particularly, to systems and methods for providing non-dedicated wireless backup service for reporting alarm events and defective telephone lines.

BACKGROUND OF THE INVENTION

The security industry has long used monitored alarm systems to report burglaries, fire, smoke, and similar alarm events. The typical monitored alarm system includes a control panel that receives data from sensors, intelligence that analyzes the data, and signaling components that report detected alarm events to a remote monitoring center. Alarm events are typically reported via a dial-up circuit switched data (CSD) connection to a public switched telephone network (PSTN) or other wireline network. The remote monitoring center resolves the event by notifying and/or dispatching appropriate responders, such as emergency medical services (EMS), local security personnel, firefighters, and police departments. Most alarm system control panels also include indicators that warn the occupants of the residence or facility of the emergency condition.

Standard phone lines may be unreliable, particularly because events such as intentional tampering, fires, and major calamities can compromise the physical communications infrastructure. To address the reliability issues, the alarm industry has developed methods of using wireless communications technology to supplement PSTN-based alarm systems, or as the sole means of communicating alarm events to remote monitoring centers.

Several approaches for wirelessly reporting alarm events have evolved in the industry. Perhaps the most basic wireless alarm event reporting system consists of a data interface to a dedicated cellular transceiver. Alarm signals and other messages can be routed over a voice channel via the dedicated cellular transceiver. As an example, the GSM 1000™ system transmits alarm signals over a GSM voice network.

Alternatively, digital signals may be transmitted over overhead control channels via a dedicated wireless device. For instance, the SKYROUTE™ transceiver uses the CELLEMETRY® wireless technology and the SS7/IS-41 network protocol to transmit short data messages without affecting the voice channels of the cellular network.

Another approach provides wireless alarm event reporting via a dedicated data-only packet-switched network, such as the narrowband MOBITEX™ mobile data technology developed by ERICSSON®. In contrast to the aforementioned systems, which use circuit-switched voice networks, a packet-switched approach obviates the need for dedicated connections for each reporting session, and potentially reduces the cost of each transmission, which is based on the number of packets sent rather than call connection time. However, this approach also introduces the additional cost of a dedicated radio modem that utilizes the Mobitex Interface Specification (MIS) open standard, which is administered by the Mobitex Operators Association.

In many of these approaches, the alarm system wirelessly communicates using the backup device only if the alarm system cannot access a landline telephone service. The backup device communicates with a mobile switching center (MSC), which authenticates the backup device and routes the call to a monitoring center.

In other approaches, the wireless communication technology is the primary or sole means of communicating with the remote monitoring center.

Typical wireless alarm event reporting approaches have several disadvantages. According to many such approaches, when an alarm event occurs, the alarm system control panel first attempts to transmit data over a PSTN connection. After detecting a transmission failure on the landline, the control panel determines that the landline is unavailable or disrupted, and transmits the data using the wireless backup device. Therefore, the alarm system only detects a loss of line integrity when the alarm system attempts to report another detected event. An alarm system that uses such a backup system may introduce a delay before reporting the disabled landline and any other alarm event. Some alarm systems attempt to address this shortcoming by periodically attempting a PSTN call to test the landline. However, this solution is imperfect due to the unnecessary disruption of the user's ability to access the landline during these tests. The test calls can also cause computer modems to lose carriers. Other alarm systems periodically check the telephone line for dial tone, but cannot detect loss of dial tone that occurs between scheduled checks.

The aforementioned systems determine the availability of a wireline connection before resorting to a backup system. To contrast, in the context of call forwarding, systems and methods have been developed for detecting the availability of a wireless device, and then performing a function in response thereto. However, these systems and methods are typically adapted to reroute to a wireline device incoming calls directed to the wireless device, rather than to route outgoing calls to the wireless device for completion.

Typical wireless event reporting devices can be expensive, due at least in part to the cost of the dedicated wireless device, service fees for access to cellular voice or data channels, and the cost of installation. Wireless alarm event reporting devices are commonly installed by making electrical connections between a telephone line and the monitoring device (such as an alarm system control panel), and between the monitoring device and a power source. Separate connections must also be made to connect the monitoring device to a radio or a cellular device, which relays the reporting data to a central station. The customer either directly or indirectly bears the cost of installation, which may require the expertise of an electrician or other professional. Furthermore, the alarm system control panel may have to be specially manufactured or modified to accommodate communication over a wireless network.

Thus, there is a need for a reliable, responsive, and less expensive system and method for providing a wireless backup to landline-based alarm systems for reporting alarm events to remote monitoring centers.

SUMMARY OF THE INVENTION

The present invention fulfills the needs described above by providing systems and methods for supplying non-dedicated wireless backup service for monitored security systems. Generally, the invention provides an intelligent interface between an existing alarm system control panel (ASCP) and a remote monitoring center. The intelligent interface relays alarm event data signals from the alarm system control panel to the remote monitoring center via a landline connection—unless a wireless device, such as a typical cellular handset, has been placed in a cradle that is integral to or associated with the interface. The invention also includes a method for providing wireless backup to an alarm system control panel, wherein placing a wireless device in the cradle automatically causes the intelligent interface to bypass the landline connection, and to relay all alarm event data from the ASCP to the wireless device. In certain embodiments, the method includes determining whether the cellular handset is available to the interface before the bypass can be effected. For example, the interface may determine whether the cellular handset is sufficiently powered or has the requisite signal strength to place a wireless call.

The systems and methods of the various embodiments of the invention are advantageous in many respects. No dedicated wireless device is required, because the intelligent interface provides wireless backup service to a landline-based alarm event reporting system, using a standard cellular handset or similar wireless device. When no wireless device is present, the intelligent interface acts as a standard PSTN network connector, such as an RJ31X jack. Therefore, the intelligent interface is compatible with existing control panels and remote monitoring centers without modification thereof.

The intelligent interface also performs the functions of a typical tabletop cradle for the wireless device, including powering and recharging the battery of the wireless device. The intelligent interface can be powered by a DC power supply, or by the control panel. The intelligent interface receives signals from the alarm system control panel via an input that is typically connected to v.32 analog modem tip and ring connectors at the alarm system control panel. The input can be, for example, a standard telephone connector (such as an RJ-11 jack), or a hard-wired tip and ring interface.

More specifically, one aspect of the present invention includes a device for relaying signals from an alarm system control panel to a remote monitoring center. The device includes, but is not limited to, an input for receiving the signals from the alarm system control panel and an intelligent interface communicatively associated with the input. As used herein, the phrase "communicatively associated" means that at least a one-way transmission path is created for exchanging voice and/or data between two or more devices, components, elements, entities, systems or networks. The intelligent interface selectively relays the signals to the remote monitoring center via either a wireless device or a landline connector. The intelligent interface bases its selection between the two communications paths on the presence or absence of a wireless device in a cradle that is integrated into the intelligent interface. The cradle receives the wireless device in such a manner that the intelligent interface can detect that the wireless device is present in the cradle. The presence of the wireless device preferably mechanically alters the communications path established by the internal wiring of the intelligent interface. Preferably, detecting that the wireless device is present in the cradle causes the intelligent interface to bypass the RJ31X or other landline connector and to communicatively associate the input from the alarm system control panel with the wireless device. The bypass is preferably effected by mechanically routing the Tip and Ring connections from the alarm system control panel to the respective Tip and Ring connections on the wireless device, although electronic routing may be implemented. For example, placing the wireless device in the cradle can cause shorting bars to create a direct connection between the alarm system control panel and the wireless device.

Once the wireless device is communicatively associated with the input (and thus with the alarm system control panel), any alarm event reporting signals generated by the alarm system control panel are diverted away from the landline connection and into the wireless device. Preferably, analog-to-digital digital signal processor (DSP) "converter" is interposed between the input and the wireless device. The converter provides dial tone and ringing signals to the alarm system control panel, and can accept dual-tone multi-frequency (DTMF) signals from the alarm system control panel. The converter receives signals from the alarm system control panel via the input, converts the signals into digital signals, and outputs or relays the converted signals to the wireless device.

Upon receiving the signals, the wireless device places a wireless call to the remote monitoring center and relays the signals from the alarm system control panel (via the input) to the remote monitoring center. The wireless call can be carried by any suitable wireless network, including voice-only, voice and data, and data-only wireless networks.

The intelligent interface also includes a landline connector, which is preferably a two-wire voice jack, such as an RJ31X jack. The landline connector is communicatively associated with the alarm system control panel (via the input) and with a public switched telephone network. When no wireless device is present in the cradle, the landline connector receives the signals from the input, and relays the signals to the remote monitoring center via the PSTN.

Preferably, detecting that the wireless device is present in the cradle also causes the intelligent interface to place the Tip and Ring connections of the internal telephones in direct connection with the respective inputs to the PSTN network.

The intelligent interface preferably also includes status indicators to indicate whether alarm event calls are routed to a wireless device, and/or the availability of the wireless device.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION

Figure 1:
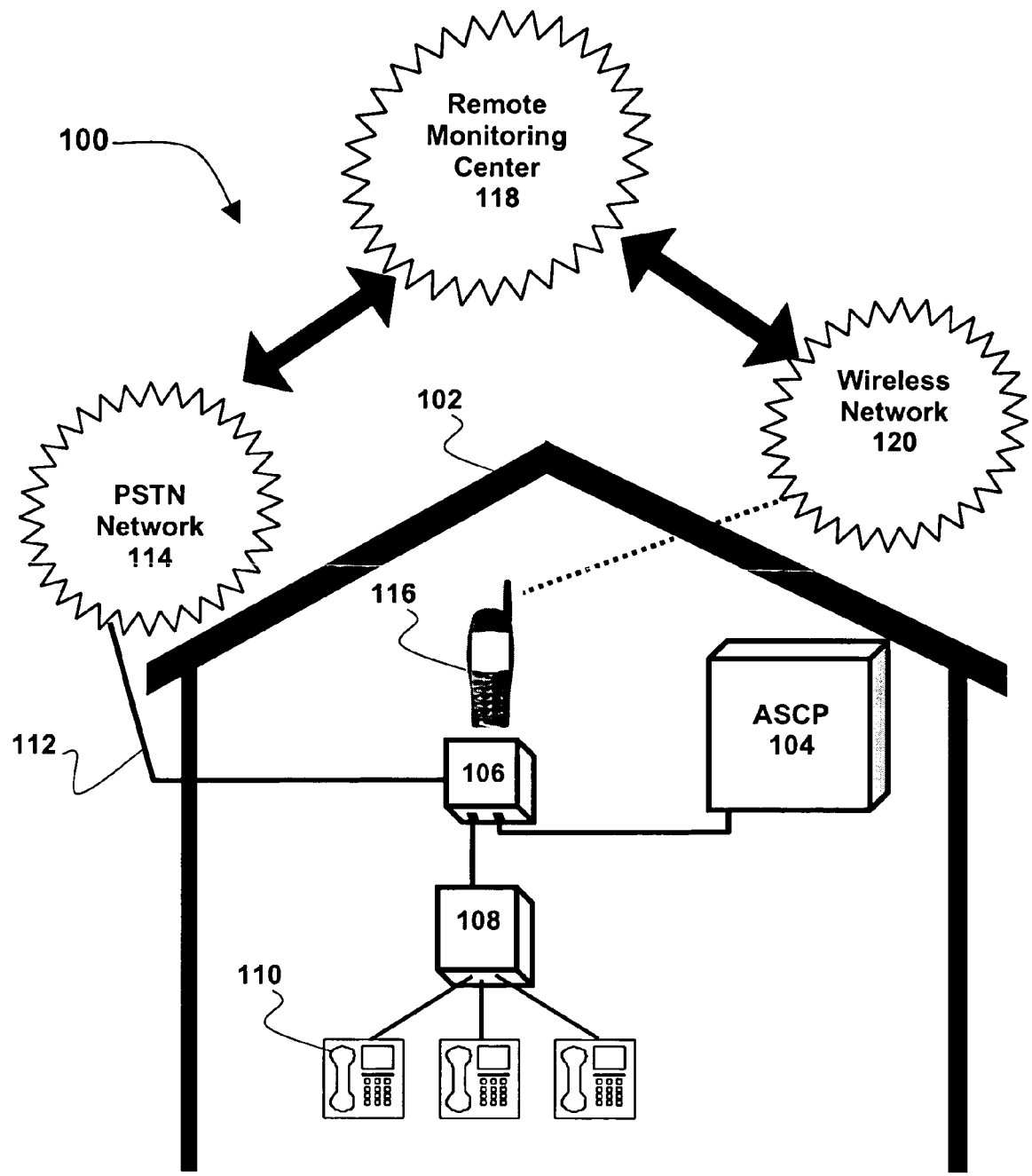
FIG. 1 is a block diagram of an exemplary environment.

Particular embodiments of the present invention will now be described in greater detail with reference to the drawings. FIG. 1 is a block diagram showing an exemplary environment according to various embodiments of the invention. The environment 100 shown is a residential structure 102 equipped with a monitored security system having an alarm system control panel (ASCP) 104. The ASCP 104 can be any suitable device that detects alarm events and transmits data over a landline to a remote monitoring center. The ASCP 104 relays signals related to detected alarm event to an intelligent interface 106 that includes a means for selectively relaying the signals to the remote monitoring center via either a wireless device or a landline connector, based on the presence of the wireless device. According to an exemplary embodiment of the present invention, the intelligent interface 106 is connected in series with the ASCP 104 and a subscriber junction box (SJB) 108. The SJB 108 is generally the physical interface between internal subscriber devices 110 and a subscriber line 112 that transmits and receives voice and data to and from a PSTN network 114.

The intelligent interface 106 preferably defines a cradle (shown in FIG. 6) for receiving a wireless device, such as a cellular handset 116. The intelligent interface 106 acts as a standard network connector when the cellular handset 116 is not present in the cradle. More specifically, the intelligent interface 106 enables the ASCP 104 to seize the subscriber line 112 to place a call over the PSTN network 114 (via at least one PSTN network interface device) to relay alarm event signals to a remote monitoring center (RMC) 118. However, when the cellular handset 116 has been received communicatively in the cradle, the intelligent interface 106 causes the call to the remote monitoring center 118 to be placed by the wireless device 116 over a wireless network 120.

Dual Mode Operation

The selective relaying of alarm event calls by the intelligent interface 106 will now be described in more detail. For clarity, the intelligent interface 106 will be described as a "dual-mode" device, having a landline mode and a wireless mode. The intelligent interface 106 transitions between the two modes based upon the presence or absence of the cellular handset 116 in the cradle. As used herein, the terms "presence" and "present" refer to a communicative association of the cellular handset 116 with the intelligent interface 106 via the cradle, such that the cellular handset 116 is available for wireless communications emanating from the intelligent interface. The terms "absence" and "absent" refer to the lack of communicative association between the cellular handset 116 and the intelligent interface 106. Absence may indicate that the cellular handset 116 is not physically in association with the cradle, or that the cellular handset 116 is bypassed, powered down, unable to access the wireless network, or is otherwise unavailable to the intelligent interface 106.

The phrase "landline mode" refers generally to the condition and operating characteristics of the intelligent interface 106 when there is no cellular handset 116 in the cradle component of the intelligent interface 106, or the cellular handset 116 is otherwise unavailable. The phrase "wireless mode" refers generally to the condition and operating characteristics of the intelligent interface 106 when a cellular handset 116 is present in the cradle. However, the intelligent interface 106 can be manually placed in landline mode via a bypass mechanism, which can be activated despite the presence of the cellular handset 116 in the cradle. Alternatively, the bypass mechanism may be activated automatically upon the occurrence of an event (such as placement of a powered down or otherwise disabled cellular handset 116 in the cradle), or according to a program or schedule.

Figure 2:
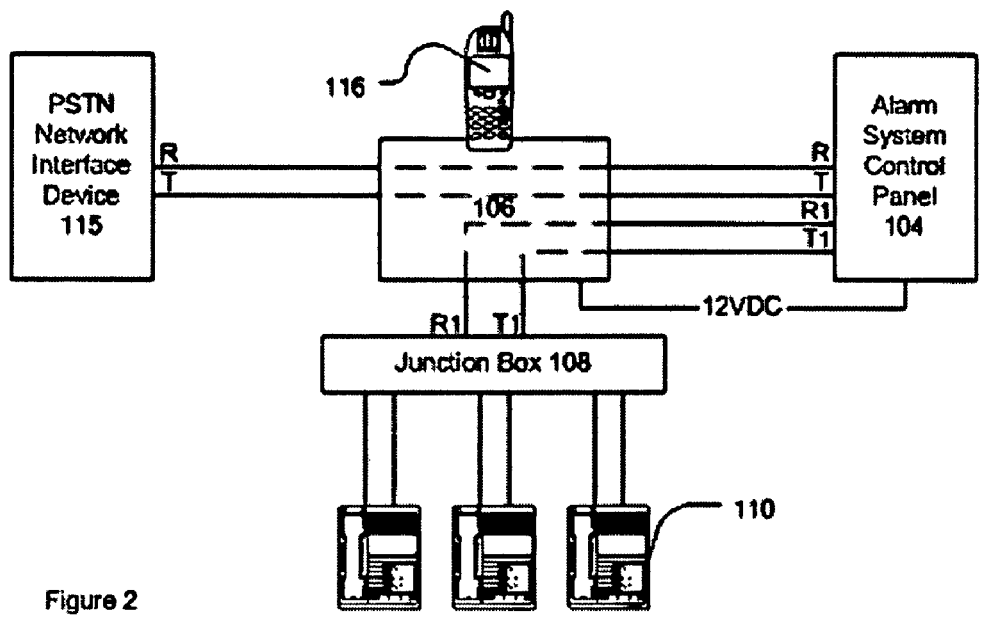
FIG. 2 is a block diagram showing functional interconnections of the intelligent interface 106 in landline mode, according to various embodiments of the invention.

FIG. 2 is a generalized block diagram showing functional interconnections of the intelligent interface 106 in landline mode, according to various embodiments of the invention. The intelligent interface 106 is connected in series between the ASCP 104 and the PSTN network interface device (PNID) 115, which may be an end office or other exchange. The intelligent interface 106 is also connected in series between the ASCP 104 and the SJB 108.

In the landline mode, a conductive path from the PSTN network 114 that is commonly referred to as the "tip wire" (T) is routed through the intelligent interface 106 directly to a signaling tip terminal at the ASCP 104. A "ring wire" (R) is routed through the intelligent interface 106 directly to a signaling ring terminal at the ASCP 104. Alarm event signals can be transmitted from the ACSP 104 to the RMC 118 over the PSTN network 114 via these interconnections, in accordance with known standard landline technology.

In the landline mode, the intelligent interface 106 enables the ASCP 104 to "seize" the landline by disrupting any ongoing calls and preventing initiation of new calls by the internal subscriber devices 110. To do so, the intelligent interface 106 functions as a standard PSTN network connector, such as an RJ31X jack. The tip and ring wires (T1 and R1) from the SJB 108 are routed through the intelligent interface 106 directly to corresponding secondary tip and ring terminals at the ASCP 104. When the ASCP 104 detects an alarm event, these series tip and ring connections enable the ASCP 104 to provide seizure or exclusion service—delivering dial tone to the ACSP 104 while excluding (by electrically disconnecting) the subscriber devices 110.

Figure 3:
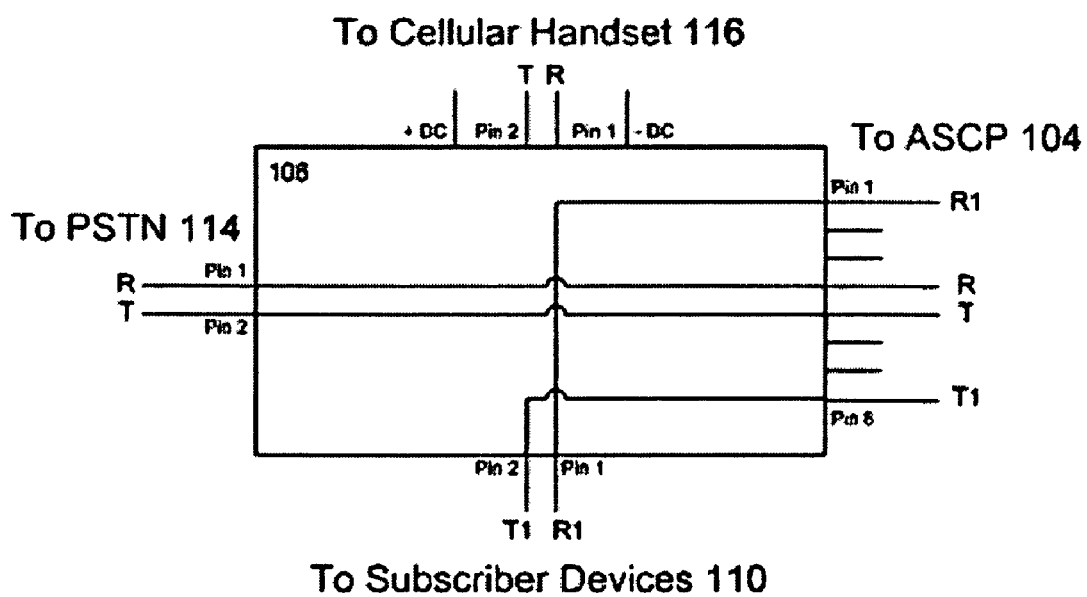
FIG. 3 is a block diagram showing functional interconnections of the intelligent interface 106 in wireless mode, according to various embodiments of the invention.

FIG. 3 is a circuit diagram showing the electrical interconnections when the intelligent interface 106 is in landline mode, according to various embodiments of the invention. The ASCP 104 is coupled with the intelligent interface 106 using a suitable known or later developed connection device, such as an RJ-45 miniature 8-position keyed connector or a direct hard-wired connection. This connection device functions as a means for receiving the signals from the ASCP 104. The SJB 108 and the PNID 115 are coupled with the intelligent interface 106 using suitable known or later developed connection devices, such as a standard RJ-11 or RJ-14 miniature 6-position connectors or direct hard-wired connections. In the figure, ASCP Pin 1 (the secondary ring terminal) is connected in series with SJB Pin 1 (the SJB ring wire). ASCP Pin 8 (the secondary tip terminal) is connected in series with SJB Pin 2 (the SJB tip wire). PNID Pin 1 (the ring wire) is connected in series with ASCP Pin 4. PNID Pin 2 is connected in series with ASCP Pin 5.

Figure 4:
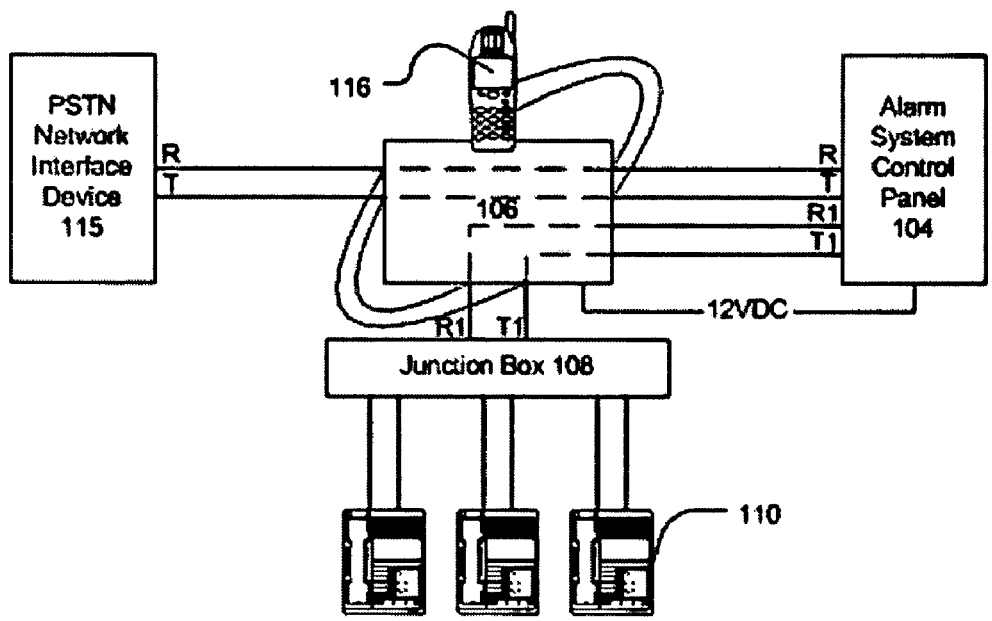
FIG. 4 is a circuit diagram showing the functional interconnections when the handset is not present in the cradle, according to various embodiments of the invention.

FIG. 4 is a generalized block diagram showing functional interconnections of the intelligent interface 106 in wireless mode, according to various embodiments of the invention. The intelligent interface 106 is connected in series between the SJB 108 and the PSTN network interface device (PNID) 115. The intelligent interface 106 is also connected in series between the ASCP 104 and the cellular handset 116.

In the wireless mode, the series connections of tip and ring wires from the PNID 115 through the intelligent interface 106 directly to the SJB 108 allow subscriber devices 110 continuous and uninterrupted access to the landline, regardless of the activation state of the ASCP 104. The series connections of the tip and ring signaling tip terminals from the ASCP 104 directly to the cellular handset 116 cause the ACSP 104 to place alarm event reporting calls using the cellular handset 116.

Thus, in the wireless mode, the ASCP 104 has no need to "seize" the landline to report alarm events. Rather, when the ASCP 104 detects an alarm event, the cellular handset 116 is directed to place a call to the remote monitoring center 118. Alarm event signals to and from the ASCP 104 are converted using a DSP (shown in FIG. 6) and transmitted via the wireless network 120.

In the wireless mode, the intelligent interface 106 may cause the cellular handset 116 to refuse any incoming calls and disable any manual override of an ongoing alarm event reporting session. To do so, the intelligent interface 106 may issue control signals (e.g., disabling the keypad and/or canceling call waiting) prior to permitting the ASCP 104 to initiate an alarm event reporting call.

Figure 5:
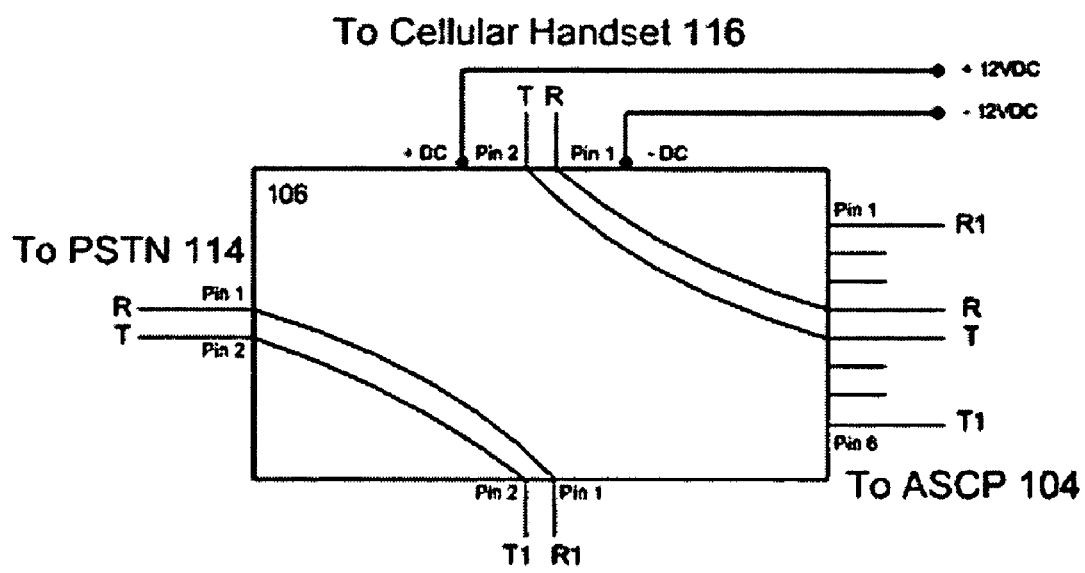
FIG. 5 is a circuit diagram showing the functional interconnections when the handset is present in the cradle, according to various embodiments of the invention.

FIG. 5 is a circuit diagram showing the electrical interconnections when the handset is present in the cradle (wireless mode). The ASCP 104, SJB 108, PNID 115 are coupled with the intelligent interface 106 using suitable known or later developed connection devices and/or methods, as described above with respect to FIG. 3. The cellular handset 116 is coupled with the intelligent interface 106 via a handset cradle that is compatible with the make and model of the cellular handset 116. Cellular handset cradles typically have at least a positive DC (+DC) and a negative DC (−DC) power supply terminal, and two pins—one designated as a tip terminal and one designated as a ring terminal. When the cellular handset 116 is present in the cradle, the intelligent interface 106 transitions from landline to wireless mode. In wireless mode, the cellular handset tip terminal is connected in series with the ASCP tip terminal (Pin 5, as shown). The cellular handset ring terminal is connected in series with the ASCP ring terminal (Pin 4, as shown). Thus, all alarm event signals are passed to the cellular handset 116. The transition to wireless mode also causes the SJB tip and ring wires to be connected in series with the respective PNID tip and ring wires.

The invention is not limited to the connectors or pin assignments shown, which are primarily designated by way of example.

Figure 6:
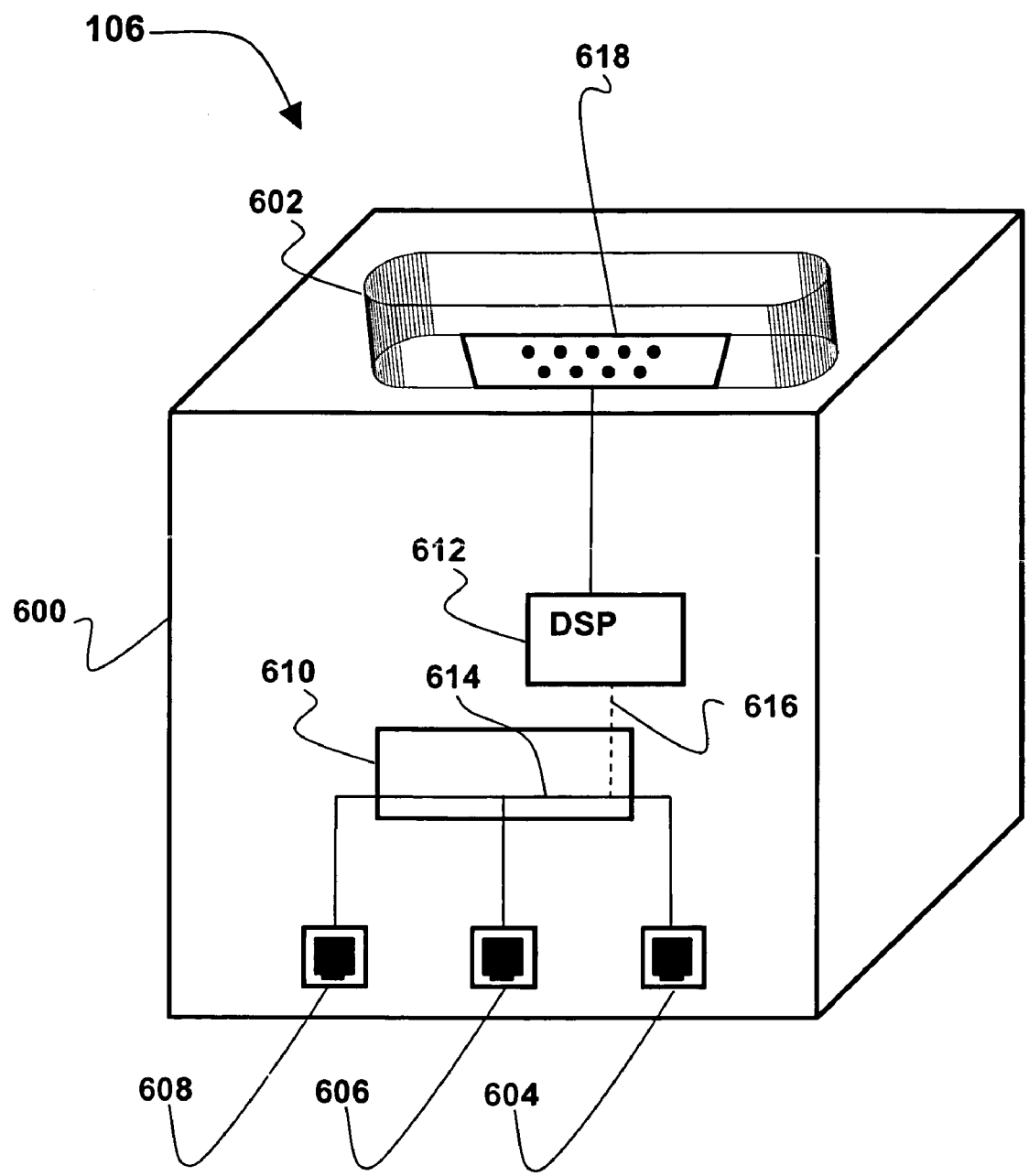
FIG. 6 is a block diagram of an exemplary intelligent interface device according to various embodiments of the invention.

FIG. 6 is a block diagram of an exemplary intelligent interface 106 according to various embodiments of the invention. The intelligent interface 106 preferably includes an enclosure 600 that defines a cradle 602 for receiving a cellular handset 116 or other wireless device. The enclosure 600 also defines an input 604, an SJB jack 606, and a PSTN jack 608 for communicatively associating the ASCP 104, SJB 108, and PSTN 114 with the intelligent interface 106, respectively. The input 604, SJB jack 606, and PSTN jack 608 are preferably easily accessible from the exterior of the intelligent interface 106.

According to certain embodiments of the invention, a network connector 610 is interconnected with the input 604, SJB jack 606, and PSTN jack 608. The network connector 610 functions as a PSTN network connector (such as an RJ-31X connector) when the intelligent interface 106 is in landline mode—seizing the landline 112 and connecting the ASCP 104 in series with the PSTN 114 when the ASCP 104 places an alarm event reporting call. The network connector 610 functions as a wireless bypass connector when intelligent interface 106 is in wireless mode—bypassing the landline 112 and placing the ASCP 104 in communication with the cellular handset 116.

As mentioned above, a converter, for example DSP 612, is preferably interposed between the ASCP 104 and the cellular handset 116, such that in wireless mode, signals from the ASCP 104 are converted from analog to digital. This conversion allows the intelligent interface 106 to convert DTMF tones generated by the ASCP 104 into signals that can be interpreted by the cellular handset 116 as commands and dialing information, and into data that can be transmitted over a wireless network. The functionality of the DSP 612 may alternatively be implemented in cellular handset 116.

The intelligent interface 106 transitions between landline mode and wireless mode primarily based on the absence or presence of the cellular handset 116 in the cradle 602. The transition is preferably effected mechanically, by means of a mechanical switching mechanism inside the cradle 602 that is triggered by the insertion or removal of the cellular handset 116. In one embodiment, to transition to wireless mode, the switching mechanism breaks or otherwise bypasses the connection 614 between the ASCP 104 and the network connector 610 and creates an alternate connection 616 between the ASCP 104 and the DSP 612, which is connected in series with the communications port of the cellular handset 116.

The intelligent interface 106 may also be placed in landline mode upon the activation of a bypass mechanism, such as a manual bypass button on the cradle 602, despite the presence of the cellular handset 116 in the cradle 602.

The communications port 618 for interfacing with the cellular handset 116 can be any known or later developed device or system usable for communicatively associating a wireless device to the intelligent interface 106, including an RS-232 serial port, infrared port, and a connection using BLUETOOTH short range wireless technology. It follows, therefore, that any such communications ports can function as means for receiving the wireless device in lieu of or in conjunction with the cradle described herein.

In certain other embodiments, the transition to and from wireless mode is effected electronically, by means of an electronic switching mechanism. A set of contacts (not shown) in the cradle 602 detect the presence of the cellular handset 116, and send a corresponding signal to a controller (not shown) that is integral to the intelligent interface 106. The controller opens the circuit between the ASCP 104 and the network connector 610 and closes an alternate path between the ASCP 104 and the DSP 612.

Those skilled in the art will appreciate that, in addition to the functions described above, the cradle 602 performs any or all of the functions typically ascribed to such cradle devices, such as battery charging. In certain embodiments, the cradle 602 is adaptable to automatically power up the cellular handset 116 when it is placed in the cradle 602 so that cellular handset 116 is available for wireless mode operation of the intelligent interface 106 (subject to activation of the bypass mechanism). In certain other embodiments, the cradle 602 can detect whether a cellular handset 116 is not properly seated so as to be connected to the communications port. Accordingly, the intelligent interface 106 may be placed in landline mode, and/or an audible or visible alert may emanate from the cradle to notify the user that wireless mode cannot be established. In certain embodiments, the cradle 602 can detect the existence of a viable connection between the cellular handset 116 and the power supply provided by the cradle. If the cellular handset is not receiving power, then the intelligent interface 106 may be placed in landline mode, and/or an audible or visible alert may emanate from the cradle to notify the user. Alternatively, in this situation, the cradle 602 may place the intelligent interface 106 in landline mode only if the level of charge maintained by the cellular handset battery is insufficient to place one or more wireless calls.

Although described with respect to a residential monitored security system, the present invention can be implemented in non-residential environments as well. Furthermore, the present invention is not limited to implementation with cellular handsets; rather, the intelligent interface can be constructed or adapted to interface with any suitable wireless device, including personal digital assistants (PDAs), radio transceivers, wireless modems, and wireless-enabled computing devices. It should be understood that each of the circuits shown in FIGS. 1–6 can be implemented as portions of a suitably programmed general purpose computer. Alternatively, each of the circuits can be implemented as physically distinct hardware circuits within an ASIC (Application Specific Integrated Circuit) chip, or using a programmable logic device (PLD), or using discrete logic elements or discrete circuit elements. The particular form each of the circuits shown in FIGS. 1–6 will take is a design choice and will be obvious and predictable to those skilled in the art.

Additions, deletions, substitutions, and/or modifications can be made to the systems and processes disclosed herein and the elements or embodiments thereof without departing from the spirit and scope of various principles, features, aspects, and advantages of the present invention.

What is claimed is:

1. A system for transmitting signals from an alarm system control panel to a remote monitoring center, comprising:
    an intelligent interface for receiving the signals from the alarm system control panel, and for selectively relaying the signals to the remote monitoring center via either a wireless device or a landline based on the presence of the wireless device, the intelligent interface comprising:
        a cradle for receiving the wireless device;
        means for detecting that the wireless device has been received and for determining whether the wireless device is is sufficiently powered to place a wireless call, said means for detecting comprising a switching mechanism selected from the group consisting of a mechanical switching mechanism and an electronic switching mechanism;
        upon detecting that the wireless device has been received and that the wireless device is is sufficiently powered to place a wireless call, means for causing the intelligent interface to bypass the landline and to relay the signals to the remote monitoring center via the wireless device; and
        a converter interposed between the alarm system control panel and the wireless device, the converter being for:
            intercepting the signals that have been relayed to the wireless device;
            converting the signals into digital signals; and
            outputting the converted signals to the wireless device; and
    a landline connector communicatively associated with a public switched telephone network, wherein if the detecting means fails to detect that the wireless device has been received, the intelligent interface relays the signals to the remote monitoring center via the landline connector.

2. The system of claim 1, wherein the landline connector is a two-wire voice jack.

3. The system of claim 1, wherein the landline connector is an RJ31X jack.

4. The system of claim 1, wherein upon receiving the converted signals, the wireless device places a wireless call to the remote monitoring center and transmits the signals to the remote monitoring center over a wireless network.

5. The system of claim 1, wherein the converter is a digital signal processor (DSP).

6. A method for transmitting signals from an alarm system control panel to a remote monitoring center, comprising;
    relaying the signals from the alarm system control panel to an intelligent interface comprising a cradle for receiving the wireless device;
    selectively relaying the signals to the remote monitoring center by:
        determining whether a wireless device has been received and whether the wireless device is sufficiently powered to place a wireless call, using a switching mechanism selected from the group consisting of a mechanical switching mechanism and an electronic switching mechanism;
        upon detecting that a wireless device has been received and that the wireless device is sufficiently powered to place a wireless call, bypassing the landline, converting the signals into digital signals, outputting the converted signals to the wireless device, and relaying the signals to the remote monitoring center via the wireless device; and
        upon detecting that if a wireless device has not been received, relaying the signals to the remote monitoring center over the landline via a landline connector communicatively associated with a public switched telephone network.

7. The method of claim 6, further comprising determining whether the wireless device has sufficient signal strength to access a wireless network.

8. The method of claim 6, wherein relaying the signals to the remote monitoring center via a wireless device comprises breaking a circuit between the alarm system control panel and the landline and creating a circuit between the alarm system control panel and the wireless device.

9. The method of claim 6, wherein relaying the signals to the remote monitoring center via a wireless device comprises mechanically breaking a circuit between the alarm system control panel and the landline and mechanically creating a circuit between the alarm system control panel and the wireless device.

10. The method of claim 6, wherein relaying the signals to the remote monitoring center via a wireless device comprises electronically breaking a circuit between the alarm system control panel and the landline and electronically creating a circuit between the alarm system control panel and the wireless device.

11. A system for transmitting signals from an alarm system control panel to a remote monitoring center, comprising;
    an intelligent interface for receiving the signals from the alarm system control panel, and for selectively relaying the signals to the remote monitoring center via either a wireless device or a landline based on the presence of the wireless device, the intelligent interface comprising;

means for receiving the wireless device;

means for detecting that the wireless device has been received and for determining whether the wireless device is sufficiently powered to place a wireless call, said means for detecting comprising a switching mechanism selected from the group consisting of a mechanical switching mechanism and an electronic switching mechanism; and upon detecting that the wireless device has been received and that the wireless device is sufficiently powered to place a wireless call, means for causing the intelligent interface to bypass the landline and to relay the signals to the remote monitoring center via the wireless device, said means for causing comprising an electronic switching mechanism; and a converter interposed between the alarm system control panel and the wireless device, the converter being for:
intercepting the signals that have been relayed to the wireless device;
converting the signals into digital signals; and
outputting the converted signals to the wireless device.

12. The system of claim 11, wherein the means for receiving comprises an interface consisting any of or any combination of: a cradle, a communications port, an RS-232 connector, an infrared port, a BLUETOOTH transceiver.

13. A system for transmitting signals from an alarm system control panel to a remote monitoring center, comprising:

an intelligent interface for receiving the signals from the alarm system control panel, and for selectively relaying the signals to the remote monitoring center via either a wireless device or a landline based on the presence of the wireless device, the intelligent interface comprising:

a cradle for receiving the wireless device, means for detecting that the wireless device has been received and for determining whether the wireless device is sufficiently powered to place a wireless call; and a mechanical switching mechanism for, upon detecting that the wireless device has been received and that the wireless device is sufficiently powered to place a wireless call, causing the intelligent interface to: bypass the landline, convert the signals into digital signals, output the converted signals to the wireless device, and to relay the signals to the monitoring center via the wireless device; and a landline connector communicatively associated with a public switched telephone network, wherein if the detecting means fails to detect that the wireless device is present, the intelligent interface relays the signals to the remote monitoring center via the landline connector.

14. A method for transmitting signals from an alarm system control panel associated with a landline to a remote monitoring center, comprising:

relaying the signals from the alarm system control panel to an intelligent interface comprising a cradle for receiving a wireless device;

selectively relaying the signals to the remote monitoring center by:
determining whether a wireless device has been received and whether the wireless device is sufficiently powered to place a wireless call, using means selected from the group consisting of a mechanical switching mechanism and an electronic switching mechanism; and upon detecting that a wireless device has been received and that the wireless device is sufficiently powered to place a wireless call, intercepting the signals that have been relayed to the wireless device, converting the signals into digital signals, outputting the converted signals to the wireless device, and using an electronic switching mechanism to bypass the landline and relay the signals to the remote monitoring center via the wireless device.

15. A method for transmitting signals from an alarm system control panel associated with a landline to a remote monitoring center, comprising:

relaying the signals from the alarm system control panel to an intelligent interface comprising means for receiving a wireless device;

selectively relaying the signals to the remote monitoring center by:
determining whether a wireless device has been received and whether the wireless device is sufficiently powered to place a wireless call;

upon detecting that a wireless device has been received and that the wireless device is sufficiently powered to place a wireless call, bypassing the landline, intercepting the signals that have been relayed to the wireless device, converting the signals into digital signals, outputting the converted signals to the wireless device, and relaying the signals to the remote monitoring center via the wireless device; and upon detecting that if a wireless device has not been received, using an electronic switching mechanism to relay the signals to the remote monitoring center over the landline via a landline connector communicatively associated with a public switched telephone network.

16. The system of claim 15, wherein the means for receiving comprises a physical interface consisting any of or any combination of: a cradle, a communications port, an RS-232 connector, an infrared port, a BLUETOOTH transceiver.

17. The method of claim 15, wherein relaying the signals from the alarm system control panel to an intelligent interface comprising means for receiving the wireless device comprises relaying the signals from the alarm system control panel to an intelligent interface comprising any of the following: a cradle, a communications port, an RS-232 connector, an infrared port, a BLUETOOTH transceiver.

* * * * *